June 15, 1965 C. J. SCHMIDT ETAL 3,189,896
RANGE AND TRACKING CIRCUIT
Filed June 27, 1960 3 Sheets-Sheet 1

INVENTOR.
CHARLES J. SCHMIDT
CONSTANTINE ANDRICOS
BY
Moses, Nolte + Nolte
Attorneys INVENTOR.
CHARLES J. SCHMIDT
CONSTANTINE ANDRICOS
BY Moses, Nolte & Nolte
Attorneys

INVENTOR.
CHARLES J. SCHMIDT
CONSTANTINE ANDRICOS

United States Patent Office 3,189,896
Patented June 15, 1965

3,189,896
RANGE AND TRACKING CIRCUIT
Charles J. Schmidt, Bergenfield, N.J., and Constantine
Andricos, New York, N.Y., assignors to Maxson
Electronics Corporation, a corporation of New York
Filed June 27, 1960, Ser. No. 39,052
9 Claims. (Cl. 343—7.3)

The range measurement by means of radar equipment is accomplished by time measurement. The time taken by a transmitted pulse to travel to a target and to return is a measure of the distance to the target from the pulse transmitter. The accuracy with which the pulse travel time is measured determines the accuracy of the range measurement.

In automatic range tracking radar equipment, this time measurement is in general accomplished by means of a time-modulated index, commonly called an early-late gate.

This index pulse is generated so that it occurs a predetermined controllable time interval after a reference pulse. If this reference pulse is the transmitted radar pulse, and the index pulse is shifted so that it coincides with the received pulse, the time between the reference and index pulse is a measure of the target distance (range).

The time modulation is usually accomplished in a sawtooth waveform time modulator, whose cycle start is controlled by the reference pulse. The time measurement by means of a sawtooth voltage wave is based on the fact that the time it takes for such a wave to reach a certain voltage level is proportional to the chosen voltage level.

For a given slope the instant at which the modulated or index pulse coincides with the pulse whose arrival time is to be measured is determined by the amplitude of the reference voltage. The time modulation of the index pulse is therefore accomplished by varying the amplitude of the reference voltage.

This reference amplitude which controls the time that the index appears is generated by an error signal which is produced by a time discriminator which compares the instant of the return signal and that of the index pulse. The sense of the error is such that the index and return signal are made to coincide.

However, such systems have only a limited dynamic range, since the determination of the index time is associated with an uncertainty that is due to the uncertainty in the voltage determination by the amplitude comparator. This limitation limits the usefulness of short range measurements.

These difficulties are overcome by the present invention, which allows distance measurements over a wide dynamic range of distances, all with a high degree of accuracy, namely with an error which decreases with the range being measured.

According to the present invention means are provided in a radar range measuring equipment which generate an electrical quantity (for example a voltage or a current) which changes in intensity with time, for example in sawtooth fashion, means which control the slope of said intensity change, means which generate a first electrical reference quantity, means which generate a pulse when said first electrical reference quantity and the generated intensity changing electrical quantity reach a predetermined ratio, means which generate a second electrical reference quantity and means which generate a pulse when said second electrical reference quantity and the generated intensity changing quantity reach a predetermined ratio.

According to the present invention the time modulator operates therefore with a constant electrical reference quantity, for example with a constant reference voltage and a variable slope.

A ranging circuit can be built for example as part of a radar system for distance measurements from a minimum range of 20 feet to a maximum range of 60,000 feet without slope switching.

This circuit would then measure the time difference between the transmit trigger and the received pulse by the use of a continuously variable slope sweep.

The invention will be fully understood and further objects thereof will become apparent from the following description and the accompanying drawings wherein.

Figure 1:
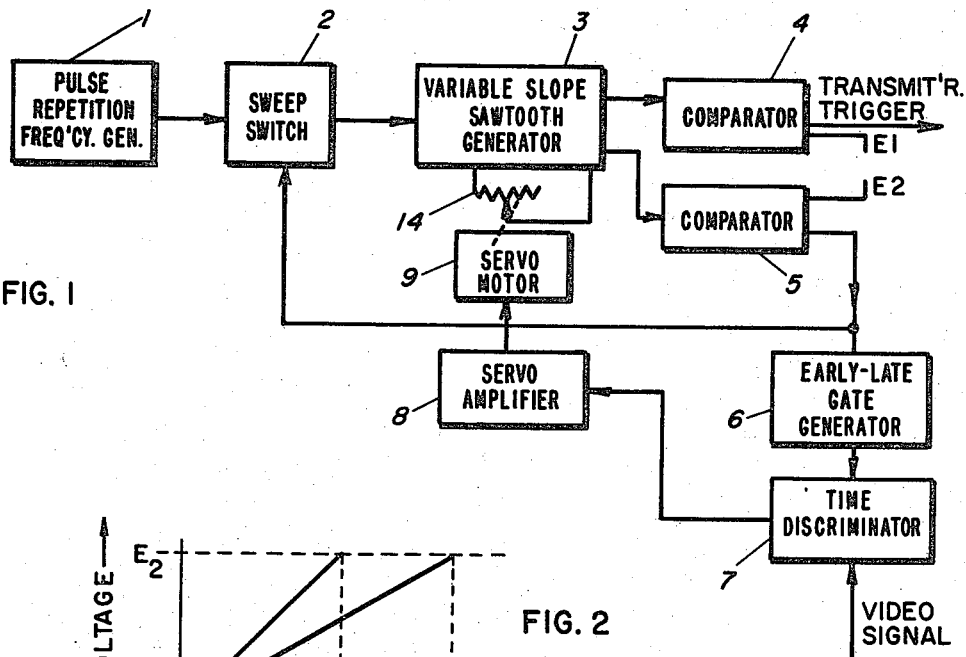
FIG. 1 is a block diagram of one embodiment of the invention.
Figure 2:
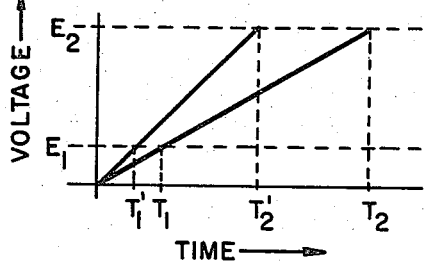
FIG. 2 is a diagram illustrating the operation of the variable slope generator.

A diagram of a system according to this invention is shown in FIG. 1. It contains a sawtooth sweep circuit and two comparators. The sawtooth generator 3 is initiated by the PRF generator 1 through the sweep switch 2. The first comparator 4 triggers when a fixed preset reference level $E_1$ (see FIG. 2) is reached to produce the transmit pulse at time $T_1$. The second comparator 5 fires at a fixed preset level $E_2$ (see FIG. 2) and at time $T_2$ to trigger an early-late gate generator 6 and also to terminate the sweep. The time difference $T_2-T_1$ is directly proportional to the slope of the sweep. The sweep slope can of course also be negative.

A time discriminator 7 produces an error signal by comparing the early-late gate signal received from the early-late gate generator 6 with the incoming video signal. The error signal controls a servo amplifier 8 which acts through a motor 9 (which acts simultaneously as an integrator) to adjust the slope of the sweep by means of a rheostat 14. Distance is then read out in terms of shaft position of the rheostat 14.

Figure 3:
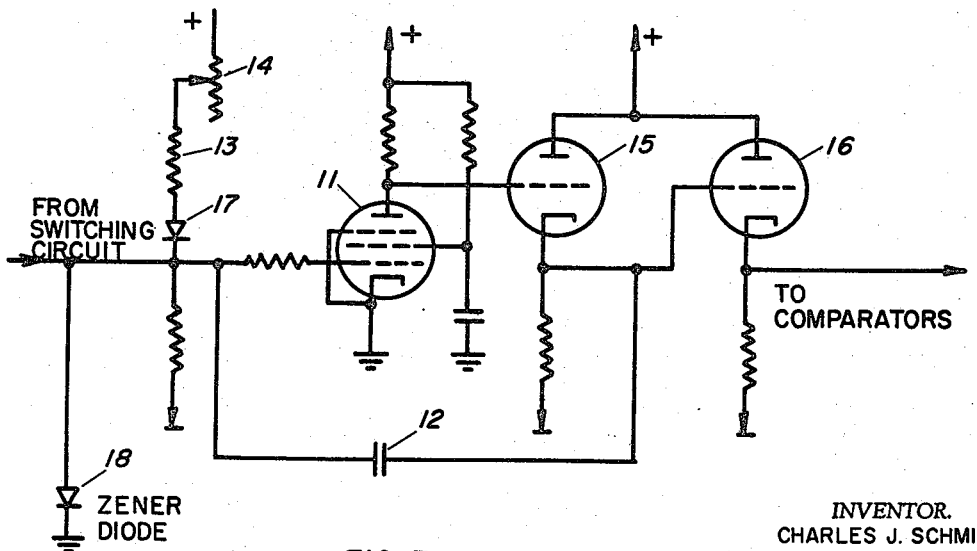
FIG. 3 is a circuit diagram of a modification particularly of the variable slope generator.

One embodiment of a variable slope sawtooth voltage generator for use in this invention is shown in FIG. 3. Here a Miller type circuit is used to produce the sweep, the slope variations being accomplished by a rheostat 14 which controls the charging current to the sweep capacitor 12.

FIG. 3 shows a pentode 11, which together with capacitor 12, resistor 13, rheostat 14 and the cathode follower 15 forms the essential parts of the Miller-type sawtooth sweep circuit. The charging circuit contains furthermore a low impedance diode 17 and at the control line of pentode 11 a Zener-diode 18. Both diodes, 17 and 18, minimize the drift of the grid voltage. Cathode follower 16 is a buffer stage.

The charging current of the capacitor 12 and therewith the slope of the sawtooth is, aside from the supply voltage, mainly controlled by the fixed resistor 13 and the variable rheostat 14. Since the reference levels of comparison in the comparators 4 and 5 (FIG. 1) are fixed, the time difference $T_2-T_1$ varies linearly with the average slope between the two voltage levels regardless of the linearity of the sweep being used. The linearity of the system depends on the linearity of that average slope change with rheostat rotation. Range measurement accuracy is a function of linearity and resolution and of a stable initial clamping level of the Miller sweep capacitor. For example a slope ratio of 60:1 can be effected by going from a short range slope of 50 volts/2 microseconds to a slope of 50 volts/120 microseconds at maximum range. The upper limit of slope rate is determined by the stray capacitances in the sweep circuit. The slope ratio is limited by the maximum charging current ratio which will give an acceptable figure of slope error due to variations of the clamp level with current. The zero error, due to D.C. level shifts of the sweep is not important since the two comparator pickoffs compensate for each other.

Since the precision of this timing scheme depends upon the sweep slope, the absolute error of the system varies inversely with range. At fast sweeps, it is possible to determine time to within ±.01 microsecond or ±5 feet assuming a comparator precision of .25 volt and a sawtooth amplitude of 50 volts. At maximum range, the resolution becomes ±.6 microsecond or ±300 feet. If the time jitter remains within the early-late gate width the averaging effect reduces the error figure.

The feature of constant percentage error is useful in systems where it is desirable to know the range at close distances very accurately without over-designing the system for far range operation, where this accuracy is not needed.

The feature of a continuously variable slope through the whole range by means of a multiturn rheostat considerably simplifies wide dynamic range circuitry by avoiding switching arrangements.

Although a Miller sweep circuit was used in the embodiment of the invention described above, any timing waveform can be used. For example a portion of a sinusoidal waveform can be used where the frequency would be inversely proportional to the range measurement. In this case, the PRF would also be inversely proportional to range.

Figure 4:
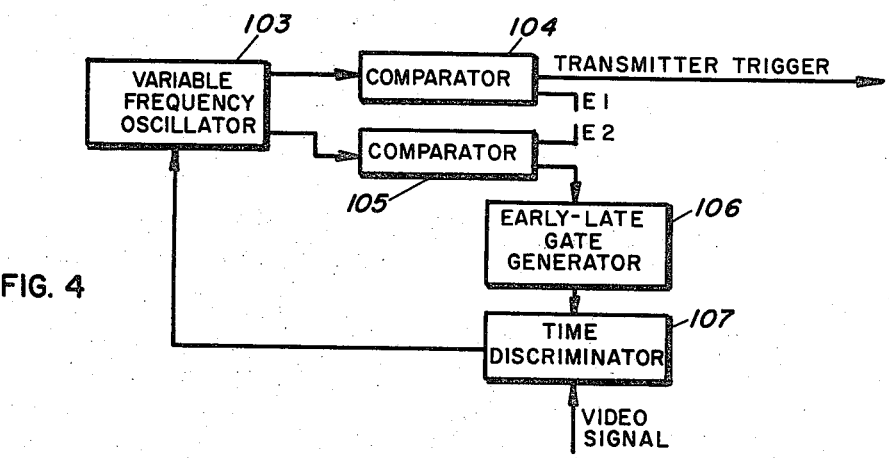
FIG. 4 is a block diagram of another embodiment of the invention.

FIG. 4 shows an embodiment of such a system. A variable frequency oscillator 103 feeds two comparators 104 and 105 which carry the reference voltages $E_1$ and $E_2$. Comparator 104 generates the transmitter trigger pulse, whereas comparator 105 which is controlled by reference voltage $E_2$ supplies the trigger to the early-late gate generator 106; the early-late gate pulse and the video-echo signal are compared in the time discriminator 107 and the resulting error signal is fed to the variable frequency oscillator 103, whose frequency is thus adjusted to modulate the early late gate generator such that it continuously minimizes the error signal.

Figure 5:
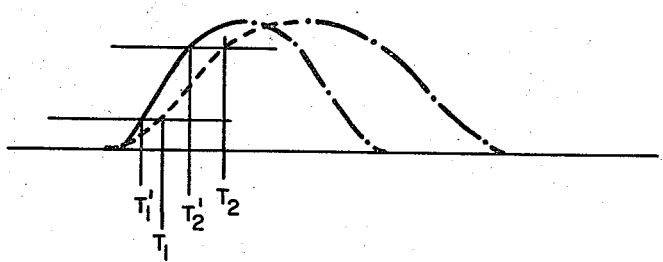
FIG. 5 is a diagram explanatory of the operation of the variable frequency oscillator of FIG. 4.

The variable frequency oscillator 103 contains a gate which only passes the rise of a sinusoidal wave but blocks the passing of the decline of the sinusoidal wave. This is shown in FIG. 5 where the dot-dashed part of the sinusoid indicates the blocked interval. $T_1$, $T_2$ and $T_1'$ and $T_2'$ are the start and stop instants of 2 sine waves of different slopes. Either the fall or rise of the sinusoid can be used.

Figure 6:
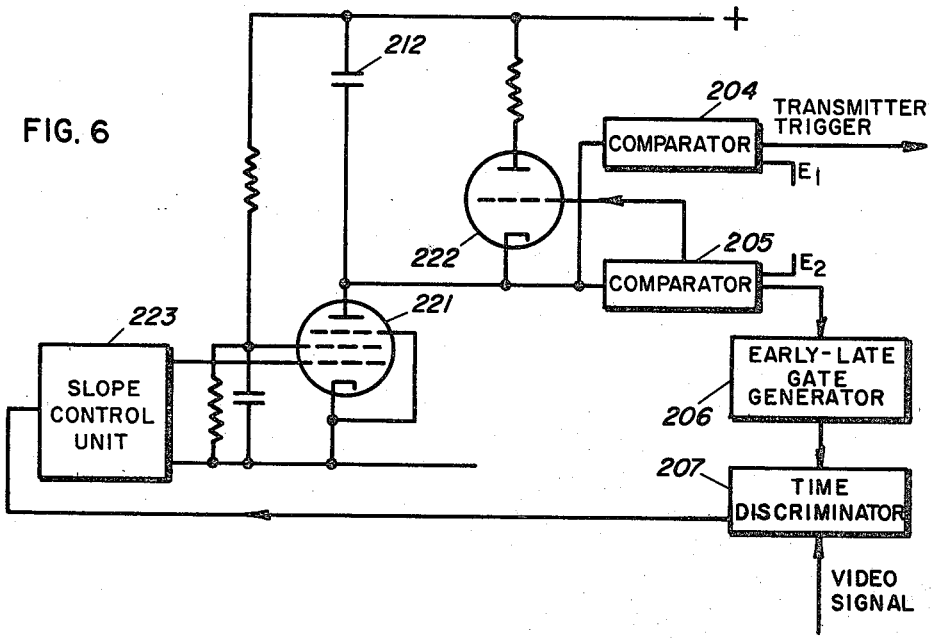
FIG. 6 is a circuit diagram of still another embodiment of the invention.

Instead of a mechanical servo motor and potentiometer arrangement an electronically controlled slope adjustment can be provided. For example, a variable current source which is electronically controlled by the time discriminator error signal can be used. The current could in this case then be used as a measure of the slope and thereby serve as the readout of the range. Such a system is shown in FIG. 6. Here a pentode 221 is used as a controllable constant current charging impedance to charge the condenser 212 which is discharged by electron device 222 upon receiving a signal from comparator 205, which contains the reference voltage $E_2$. Comparator 204 which contains reference voltage $E_1$ releases a pulse to trigger the radar transmitter. A signal from comparator 205 initiates the early-late gate generator 206 whose output instant is compared in the time discriminator 207 with that of the video signal (echo). The output of the time discriminator 207 controls the slope control unit 223 which supplies a voltage to the pentode 221, that controls the average slope of the sweep.

Having described our invention in some detail, it will be understood, that changes may be made without departing from the general principles and scope of our invention.

We claim:
1. In a radar range measuring apparatus the combination of means for generating a first electrical quantity which varies in intensity with time and has a slope of a given sign, means for generating an electrical reference quantity, means connected to both of said generating means for generating a first pulse when said reference quantity and said first electrical quantity reach a predetermined ratio, means for generating a second electrical reference quantity, means connected to both said last-named means and said first electrical quantity means for generating a second pulse when said second reference quantity and said first electrical quantity reach a predetermined ratio, and means connected to the output of said second pulse generating means for controlling the slope of said first electrical quantity.

2. Radar range measuring equipment comprising means for generating a voltage whose intensity changes uniformly with time, means for generating a first electrical reference voltage, first comparison means connected to both of said generating means for generating a pulse when said intensity reaches the level of said first reference voltage, means for generating a second electrical reference voltage, second comparison means connected to said first named generating means and said second reference voltage generating means for generating a pulse when said intensity reaches the level of said second reference voltage, and means connected to the output of said second comparison means for controlling the rate of changes in intensity with time.

3. Automatic radar range measuring equipment comprising first generator means for generating a first group of pulses, means connected to said first generator means for generating a varying voltage in response to said first pulses, second generator means connected to said varying voltage generating means for generating a second group of pulses when said varying voltage reaches a certain first level, third generator means connected to said varying voltage generating means for generating a third group of pulses when said varying voltage reaches a given second level different from said first level, an early-late gate generator connected to said third generator means including means for initiating the early-late gate signals in response to said third group of pulses, a time discriminator connected to the output of said early-late gate generator, means for impressing received video signals on said time discriminator and deriving therefrom an error signal, a servo amplifier connected to said time discriminator for receiving the error signal therefrom, and means connected to said servo amplifier for controlling the slope of said varying voltage between said first and second levels thereof.

4. An automatic radar range measuring equipment comprising first generator means for generating a first group of pulses, sawtooth wave generator means responsive to said pulses for generating a sawtooth voltage, second generator means connected to said sawtooth wave generator means for generating a second group of pulses when said sawtooth voltage reaches a certain first level, third generator means connected to said sawtooth wave generator means for generating a third group of pulses when said sawtooth voltage reaches a given second level different from said first level, an early-late gate generator means connected to the output of said third generator means for producing early-late gate signals in response to said third group of pulses, a time discriminator means connected to receive the early-late gate signals and received video input signals and derive an error signal therefrom, a servo amplifier connected to said time discriminator, and means connected to said servo amplifier for controlling the slope of said sawtooth voltage between said first and second levels in response to said error signal.

5. An automatic radar range measuring equipment according to claim 4 wherein said means for generating a sawtooth voltage is a Miller-integrator circuit.

6. An automatic radar range measuring equipment comprising sine wave generator means for generating a variable frequency sinusoidal voltage, first generator means connected to said sine wave generator means for generating a first group of pulses when said sinusoidal voltage reaches a given first level, second generator means connected to said sine wave generator means for generating a second group of pulses when said sinusoidal voltage reaches a given second level different from said first level, an early-late gate generator means connected to said last mentioned means to initiate an early-late gate in response to said second pulses, a time discriminator connected to said early-late gate generator means, means for impressing received video signals on said time discriminator and means for deriving error signals from said time discriminator in response to said early-late gate signals, and said video signals and means responsive to said error signals for varying the frequency of said sinusoidal voltage.

7. An automatic radar range measuring equipment comprising means for generating a pulse, electronic means responsive to said pulse for generating a saw-tooth voltage, means connected to said electronic means for generating a second pulse when said saw-tooth voltage reaches a given first level, means connected to said electronic means for initiating a third pulse when said saw-tooth voltage reaches a given second level different from the first level, an early-late gate generator means connected to said means for initiating a third pulse to provide an early-late gate in response to said third pulse, a time discriminator means for receiving said early-late gate generator output, means for impressing received video signals on said time discriminator means, said time discriminator means producing an error signal in response to said video signal and said early-late gate generator, means connected to said time discriminator means for producing a voltage dependent upon said error signal, said sawtooth voltage generator including a condenser and electronic means for controlling the charging current of said condenser in accordance with the error signal dependent voltage for controlling the slope of said sawtooth voltage.

8. Time measuring apparatus comprising first pulse generator means for generating a first group of pulses, sawtooth wave generator means connected to said first pulse generator means and responsive to said pulses for generating a sawtooth voltage, second pulse generator means connected to said sawtooth wave generator means for generating a second group of pulses when said sawtooth voltage reaches a certain first level, third generator means connected to the output of said sawtooth wave generator means for generating a third group of pulses when said sawtooth voltage reaches a given second level different from said first level, an early-late gate generator means connected to said third generator means for producing early-late gate signals in response to said third group of pulses, a time discriminator means connected to receive the early-late gate signals and received video signals and derive an error signal therefrom, means connected to said time discriminator for controlling the slope of said sawtooth voltage between said first and second levels in response to said error signal.

9. In a radar range measuring apparatus the combination of means for generating an electrical quantity varying in intensity with time and having a slope of a given sign, means for generating first and second electrical reference quantities, video signal input means, a first comparison means connected to said varying quantity generating means and said first reference quantity generating means for transmitting a pulse when said electrical quantity reaches said first reference quantity, a second comparison means connected to said varying quantity generating means and said second reference quantity generating means for producing a trigger pulse when said electrical quantity reaches said second reference quantity, time discriminator means connected to said last named comparison means and said video signal input means for measuring the time difference between the return time of said transmitted pulse produced at said video signal means and said trigger pulse produced by said second comparison means, and means connected to said time comparison means for controlling the slope of said electrical quantity between said reference quantities in response to said time comparison.

References Cited by the Examiner

UNITED STATES PATENTS 2,414,486  1/47  Rieke _____ 343—17.1

CHESTER L. JUSTUS, *Primary Examiner.*